US012385305B2

(12) United States Patent
Coleman et al.

(10) Patent No.: US 12,385,305 B2
(45) Date of Patent: Aug. 12, 2025

(54) LEADING END ASSEMBLIES FOR MOVABLE PARTITIONS HAVING AN ARTICULATED LEADING MEMBER, AND RELATED SYSTEMS AND METHODS

(71) Applicant: Won-Door Corporation, Salt Lake City, UT (US)

(72) Inventors: William Michael Coleman, Salt Lake City, UT (US); R. Scott Smart, Draper, UT (US); Tracy M. Knight, Kearns, UT (US); Ivan W. Stewart, Herriman, UT (US)

(73) Assignee: Won-Door Corporation, Salt Lake City, UT (US)

( * ) Notice: Subject to any disclaimer, the term of this patent is extended or adjusted under 35 U.S.C. 154(b) by 879 days.

(21) Appl. No.: 16/949,848

(22) Filed: Nov. 17, 2020

(65) Prior Publication Data

US 2022/0154506 A1 May 19, 2022

(51) Int. Cl.

*E05D 15/06* (2006.01)
*E05D 15/26* (2006.01)
*E06B 3/48* (2006.01)
*E06B 3/94* (2006.01)

(52) U.S. Cl.

CPC ......... *E05D 15/0652* (2013.01); *E05D 15/26* (2013.01); *E05D 2015/268* (2013.01); *E05Y 2201/612* (2013.01); *E05Y 2201/684* (2013.01); *E05Y 2900/142* (2013.01); *E06B 3/481* (2013.01); *E06B 3/94* (2013.01)

(58) Field of Classification Search

CPC ..... E05D 15/06; E05D 15/0626; E05D 15/26; E05D 2015/268; E05D 15/16; E05D 15/24; E05D 15/244; E05D 15/248; E05Y 2900/142; E05Y 2201/61; E05Y 2201/612; E06B 3/805; E06B 3/94; E06B 9/06; E06B 3/481

See application file for complete search history.

(56) References Cited

U.S. PATENT DOCUMENTS

| | | | | | |
|---|---|---|---|---|---|
| 2,915,115 | A * | 12/1959 | Reynolds | E06B 3/94 | 160/40 |
| 2,990,566 | A * | 7/1961 | Lee | E05D 13/04 | 267/164 |
| 3,261,128 | A * | 7/1966 | Slopa | E05D 15/1021 | 49/118 |
| 3,447,584 | A | 6/1969 | Smart | | |
| 3,481,388 | A | 12/1969 | Smart | | |
| 3,509,934 | A | 5/1970 | Smart | | |

(Continued)

FOREIGN PATENT DOCUMENTS

JP 2007-321421 A 12/2007

*Primary Examiner* — Daniel P Cahn
*Assistant Examiner* — John W Hanes, Jr.
(74) *Attorney, Agent, or Firm* — TraskBritt

(57) ABSTRACT

Movable partitions may include leading end assemblies comprising an articulated leading member. The articulated leading member may be coupled to a support trolley, and at least one coupling between the articulated leading member and the trolley enables the articulated leading member to move relative to the support trolley. Methods of operating a movable partition include displacing a portion of a leading end assembly to align a majority of at least one surface of the leading end assembly with a portion of an adjacent structure.

20 Claims, 7 Drawing Sheets

(56) References Cited

U.S. PATENT DOCUMENTS

| | | | | |
|---|---|---|---|---|
| 3,720,254 | A | 3/1973 | Smart | |
| 3,807,480 | A | 4/1974 | Smart | |
| 4,103,463 | A * | 8/1978 | Dixon | E05D 15/0613 52/143 |
| 4,133,364 | A | 1/1979 | Smart | |
| 4,189,173 | A | 2/1980 | Rester | |
| 4,834,161 | A | 5/1989 | Johnson et al. | |
| 4,837,891 | A * | 6/1989 | Toma | E05D 15/0613 104/111 |
| 4,915,153 | A * | 4/1990 | Toti | A47H 15/02 160/345 |
| 4,924,929 | A | 5/1990 | Johnson et al. | |
| RE34,665 | E | 7/1994 | Strand | |
| 5,577,348 | A * | 11/1996 | Keller | E06B 7/2318 160/40 |
| 5,638,639 | A | 6/1997 | Goodman et al. | |
| 5,816,309 | A | 10/1998 | Paradise | |
| 6,209,171 | B1 * | 4/2001 | Pelletier | E05D 15/08 403/374.5 |
| 6,223,804 | B1 * | 5/2001 | Toti | E06B 9/386 160/199 |
| 6,296,038 | B1 | 10/2001 | Chen | |
| 6,330,763 | B1 * | 12/2001 | Kern | E05D 15/1021 49/226 |
| 6,662,848 | B2 | 12/2003 | Goodman et al. | |
| 6,935,662 | B1 | 8/2005 | Hauber et al. | |
| 7,066,297 | B2 | 6/2006 | Goodman et al. | |
| 7,353,637 | B2 | 4/2008 | Harger et al. | |
| 7,448,426 | B2 | 11/2008 | Hsieh | |
| 7,478,663 | B2 * | 1/2009 | Goodman | E05F 15/635 160/84.02 |
| 7,845,386 | B2 * | 12/2010 | Coleman | E05D 15/26 160/84.01 |
| 8,336,597 | B2 * | 12/2012 | Laraway | E06B 3/94 160/40 |
| 8,365,796 | B2 * | 2/2013 | Coleman | E05F 15/605 160/331 |
| 8,376,020 | B2 * | 2/2013 | Smart | E05D 15/266 160/199 |
| 8,448,688 | B2 * | 5/2013 | Goodman | E05D 15/26 280/124.1 |
| 8,544,524 | B2 * | 10/2013 | Goodman | E05D 15/26 160/199 |
| 8,763,672 | B2 | 7/2014 | Smart et al. | |
| 8,899,299 | B2 * | 12/2014 | Stewart | E05F 5/025 160/199 |
| 8,910,695 | B2 * | 12/2014 | Knight | E05F 15/76 160/84.02 |
| 8,967,225 | B2 * | 3/2015 | Coleman | E06B 1/60 160/199 |
| 9,353,568 | B2 * | 5/2016 | Knight | E05F 15/635 |
| 11,021,873 | B2 * | 6/2021 | Banta | E06B 3/4654 |
| 2004/0194386 | A1 | 10/2004 | Albiero | |
| 2007/0095488 | A1 | 5/2007 | Huang | |
| 2007/0289090 | A1 * | 12/2007 | Cai | A47H 15/02 16/97 |
| 2008/0006594 | A1 | 1/2008 | Ayton | |
| 2008/0105387 | A1 | 5/2008 | Coleman et al. | |
| 2008/0105389 | A1 | 5/2008 | Goodman et al. | |
| 2008/0115896 | A1 | 5/2008 | Goodman | |
| 2008/0264578 | A1 * | 10/2008 | Goodman | E05D 15/26 160/202 |
| 2009/0044918 | A1 | 2/2009 | Goodman et al. | |
| 2010/0006237 | A1 * | 1/2010 | Claypool | E04B 2/827 52/243.1 |
| 2010/0056311 | A1 * | 3/2010 | Kondash | E05F 15/684 474/138 |
| 2010/0299871 | A1 * | 12/2010 | Kondash | E06B 3/481 16/87 R |
| 2011/0126471 | A1 * | 6/2011 | Hans | E06B 7/18 49/409 |
| 2012/0043033 | A1 * | 2/2012 | Drew | E06B 9/06 160/341 |
| 2012/0325412 | A1 * | 12/2012 | Goodman | E05F 15/605 16/101 |
| 2013/0067818 | A1 * | 3/2013 | Stewart | E05F 5/025 49/404 |
| 2018/0258676 | A1 * | 9/2018 | Rebarchek | E05D 15/26 |
| 2021/0001931 | A1 * | 1/2021 | Schultz | B60D 1/249 |
| 2022/0154506 | A1 * | 5/2022 | Coleman | E05D 15/0652 |

* cited by examiner

LEADING END ASSEMBLIES FOR MOVABLE PARTITIONS HAVING AN ARTICULATED LEADING MEMBER, AND RELATED SYSTEMS AND METHODS

TECHNICAL FIELD

Embodiments of the present disclosure are directed to leading end assemblies for movable partitions, movable partitions including leading end assemblies, and methods of operating movable partitions. In particular, embodiments of the present disclosure are directed to leading end assemblies for movable partitions comprising an articulated leading member and related assemblies, systems, and methods.

BACKGROUND

Movable partitions are utilized in numerous situations and environments for a variety of purposes. Such partitions may include, for example, a movable partition including foldable or collapsible doors configured to enclose or subdivide a room or other area. Often, such partitions may be utilized simply for purposes of versatility in being able to subdivide a single large room into multiple smaller rooms. The subdivision of a larger area may be desired, for example, to accommodate multiple groups or meetings simultaneously. In other applications, such partitions may be utilized for noise control depending, for example, on the activities taking place in a given room or portion thereof.

Movable partitions may also be used to provide a security barrier, a fire barrier, or both a security barrier and a fire barrier. In such a case, the partition may be configured to automatically close upon the occurrence of a predetermined event such as the actuation of an associated alarm. For example, one or more accordion or similar folding-type partitions may be used as a security barrier, a fire barrier, or both a security barrier and a fire barrier wherein each partition is formed with a plurality of panels connected to one another with hinges. The hinged connection of the panels allows the partition to fold and collapse into a compact unit for purposes of storage when not deployed. The partition may be stored in a pocket formed in the wall of a building when in a retracted or folded state. When the partition is deployed to subdivide a single large room into multiple smaller rooms, secure an area during a fire, or for any other specified reason, the partition may be extended along an overhead track, which is often located above the movable partition in a header assembly, until the partition extends a desired distance across the room.

When deployed, a leading end of the movable partition, often defined by a component known as a lead post or leading end assembly, complementarily engages another adjacent structure such as a fixed structure (e.g., a wall), a receptacle in the fixed structure, or a mating receptacle of another door. Such receptacles may be referred to as a jamb or a door post when formed in a fixed structure, or as a mating lead post when formed in another movable partition.

BRIEF SUMMARY

In accordance with some embodiments of the present disclosure, movable partition systems may comprise a plurality of hingedly coupled panels movably coupled to a track, and a leading end assembly coupled to at least one panel of the plurality of hingedly coupled panels. The leading end assembly may comprise a support trolley for moving the leading end assembly along the track, and an articulated leading member coupled to the support trolley. At least one coupling between the leading member and the trolley may enable the articulated leading member to move relative to the support trolley.

In accordance with additional embodiments of the present disclosure, a leading end assembly for a movable partition system may comprise a trolley for moving the leading end assembly along a track. An articulated leading member may be coupled to the trolley with an articulated coupling, a resilient coupling, and a counter-balancing coupling. The counter-balancing coupling may apply a biasing force to the articulated leading member countering a weight imbalance of the articulated leading member about the articulated coupling.

In yet additional embodiments of the present disclosure, methods of operating a movable partition may comprise moving a movable partition along an overhead track between a retracted position and an extended position. The methods may further comprise contacting an adjacent structure with a portion of an articulated leading member, and responsive to contacting the adjacent structure with the articulated leading member, displacing the articulated leading member to align a majority of at least one surface of the articulated leading member with a portion of the adjacent structure.

BRIEF DESCRIPTION OF THE SEVERAL VIEWS OF THE DRAWINGS

While the specification concludes with claims particularly pointing out and distinctly claiming which are regarded as embodiments of the present disclosure, the advantages of embodiments of the disclosure may be more readily ascertained from the description of embodiments of the disclosure when read in conjunction with the accompanying drawings.

DETAILED DESCRIPTION

Illustrations presented herein are not meant to be actual views of any particular device or system, but are merely idealized representations that are employed to describe example embodiments of the present disclosure. Additionally, elements common between figures may retain the same numerical designation.

In some embodiments, the leading end assemblies and movable partition systems disclosed herein may be similar to those described in U.S. patent application Ser. No. 13/169,299, filed Jun. 27, 2011 and entitled "Methods, Apparatuses, and Systems for Driving a Movable Partition with a Lead Drive Box," the disclosure of each of which is incorporated herein in its entirety by this reference.

As described in above-referenced U.S. patent application Ser. No. 13/169,299, movable partitions may include a drive motor (i.e., a motor that drives the movable partition between expanded and retracted states) positioned on the movable partition proximate to the leading end assembly, for example, in a lead drive box formed by the leading end assembly.

It is desirable that the lead post or leading end assembly of movable partition be substantially aligned with the fixed structure and/or mating receptacle such that the movable partition may be completely closed and an appropriate seal formed between the movable partition and the another adjacent structure. Embodiments of the present disclosure include a leading end assembly having an articulated leading member that is movably coupled (e.g., not rigidly coupled) to another portion of the leading end assembly or movable partition. For example, the leading member may be movable relative to another portion of the leading end assembly (e.g., a trolley that supports the leading end assembly from an overhead track and/or a vertical support structure) about at least one axis (e.g., without deforming the articulated leading member) while the remainder of the leading end assembly remains in the same position. Such a configuration enables the articulated leading member of the leading end assembly to adjust to one or more adjoining structures (e.g., a portion of an opposing wall, a portion of a pocket in which the movable partition is stored in a retracted state, or combinations thereof) in order to ensure that the articulated leading member is in substantially alignment with the one or more adjoining structures.

Figure 1:
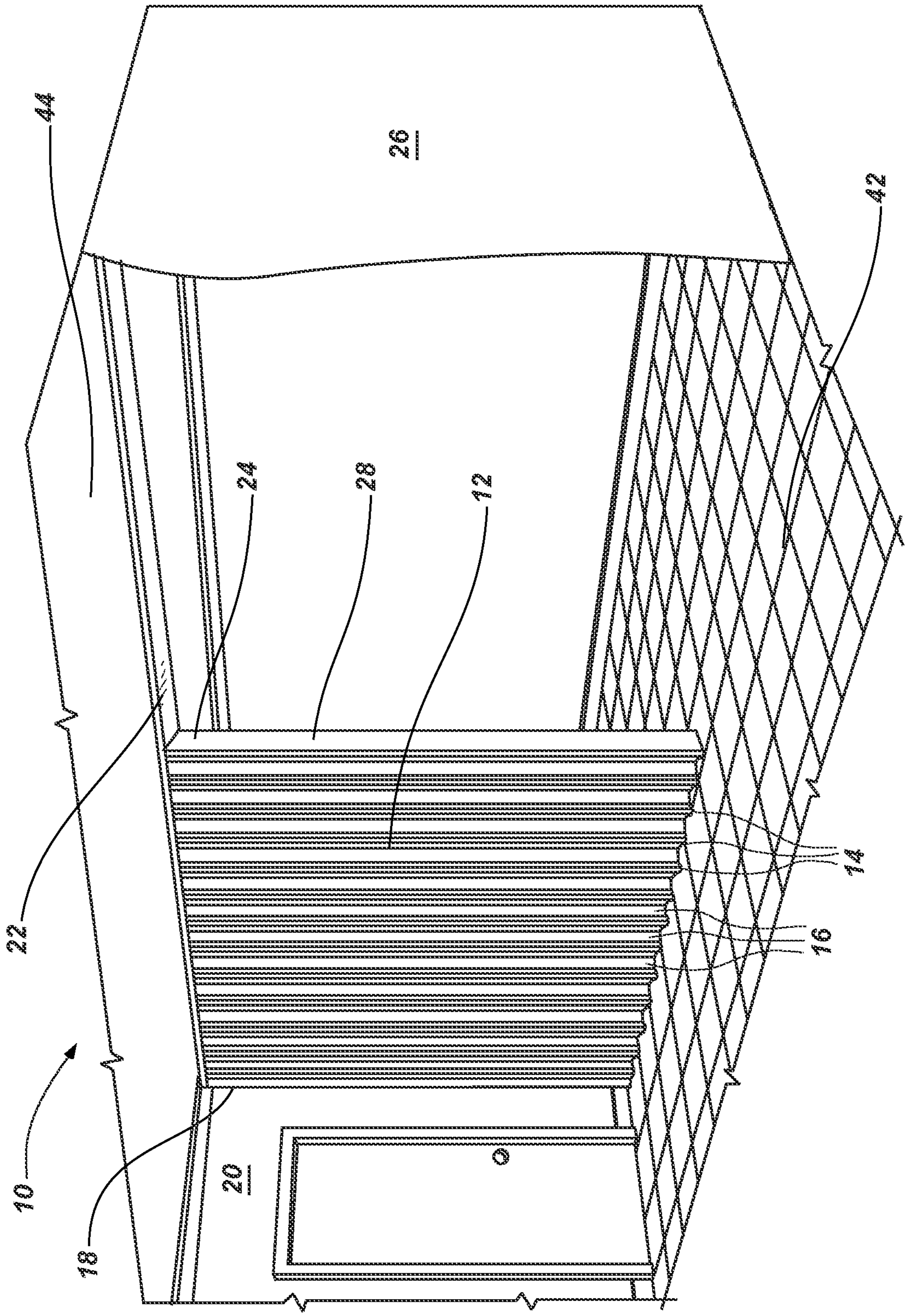
FIG. 1 is a perspective view of a system including a movable partition in accordance with an embodiment of the present disclosure.

Referring to FIG. 1, a movable partition system 10 is shown, including a movable partition 12 in the form of an accordion-type door. The movable partition 12 may be used as a barrier (e.g., a security barrier, a fire barrier, or both a security barrier and a fire barrier). In other embodiments, the movable partition 12 may be used, for example, to subdivide a relatively larger space into relatively smaller spaces (e.g., rooms or areas). The movable partition 12 may be formed with a plurality of panels 16 that are connected to one another with hinges or other hinge-like members 14 to form a pleated (i.e., a plicated) structure. The movable partition 12 may be suspended from an overhead track 22 along which the movable partition 12 moves as the movable partition 12 is extended (i.e., closed) and retracted (i.e., opened). The hinged connections of the panels 16 allow the movable partition 12 to be compactly stored in a storage area such as, for example, a storage pocket 18 formed in a wall 20 of a building when in a retracted or folded state.

To deploy the movable partition 12 to an extended position, the movable partition 12 is moved along the overhead track 22 to an adjoining structure positioned at an end portion of the overhead track 22. A leading end structure of the movable partition 12 may include a leading end assembly 24 configured to engage with an adjoining structure such as, for example, an opposing wall 26, a door jamb, or a leading end assembly of another movable partition (not shown). While the embodiment of the movable partition 12 shown and described with reference to FIG. 1 contains a single accordion-type door, additional embodiments may include multiple doors. For example, a partition may include two doors (e.g., accordion-type doors) configured to extend across a space and join together to partition a space.

As discussed in further detail below, the leading end assembly 24 includes an articulated leading member 28 that is coupled to a trolley (e.g., support trolley 30 (FIG. 3)) that supports the leading end assembly 24 from the overhead track 22. For example, the articulated leading member 28 may be movable relative to another portion of the leading end assembly 24 (e.g., a portion of the leading end assembly 24 other than the articulated leading member 28, such as, for example, the trolley) in two or more axes of direction relative to the remainder of the leading end assembly 24. Such a configuration may enable the articulated leading member 28 of the leading end assembly 24 to adjust to one or more adjoining structures (e.g., a portion of the opposing wall 26, a portion of the wall 20, such as the pocket 18, or combinations thereof) in order to ensure that the articulated leading member 28 is at least substantially plumb with (e.g., in substantially alignment with) the one or more adjoining structures. For example, the articulated leading member 28 of the leading end assembly 24 may substantially align by orienting at least a majority of at least a surface of the leading member 28 (e.g., orienting a majority or an entirety of the leading or trailing surface of the leading member 28, orienting a majority or an entirety of the entire leading member 28, or combinations thereof) with the adjoining structure.

Figure 2:
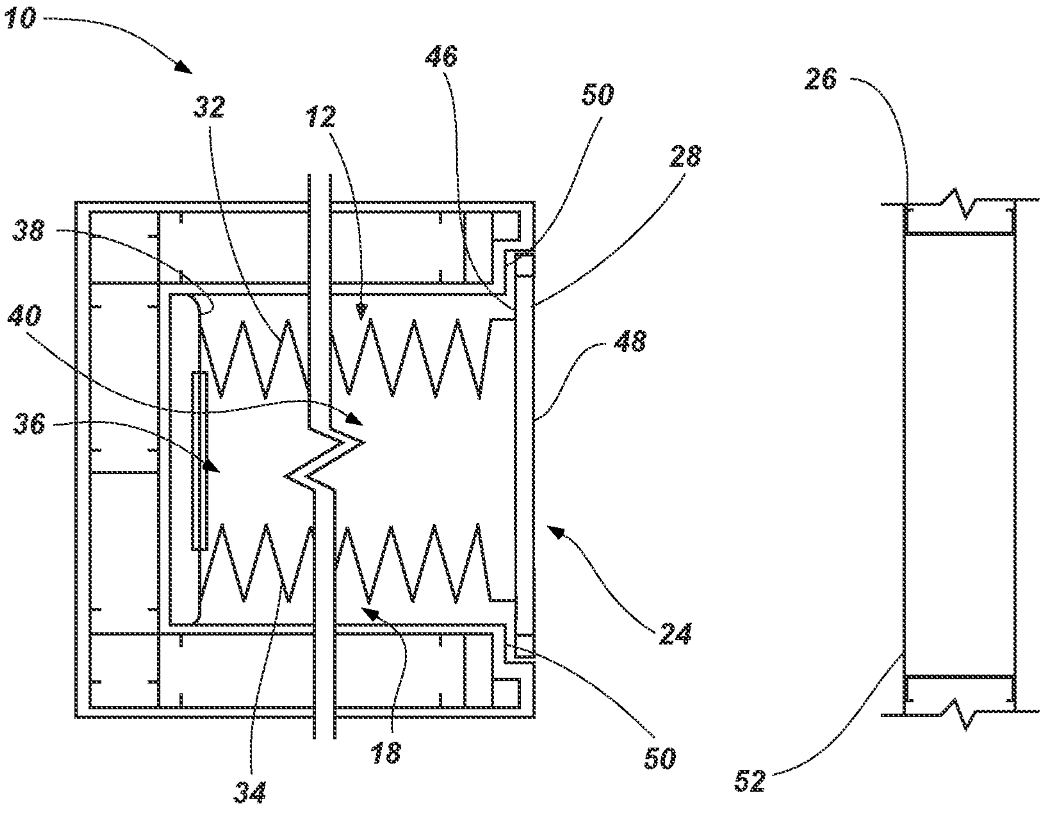
FIG. 2 is a simplified and schematically illustrated partial cross-sectional view of the movable partition of FIG. 1.

Referring to FIG. 2, the movable partition system 10 is shown in a partial cross-sectional schematic view in a retracted state. As shown in FIG. 2, a movable partition system 10 may include an accordion-style movable partition 12 that may include a first assembly or structure 32 and a second assembly or structure 34 that is laterally spaced from, and extends generally parallel to, the first structure 32. Each of the two structures 32 and 34 has a trailing end 36 structurally fixed to a jamb such as, for example, a floating jamb 38 that is movable within the pocket 18, and a leading end 40 that is attached to the leading end assembly 24.

When the movable partition 12 is in a retracted state, the movable partition 12 may be stored in the pocket 18 formed by one or more walls. For example, as shown in FIG. 2, the pocket 18 may be provided by one or more walls extending substantially parallel to each other and extending between a floor 42 and a ceiling 44 (FIG. 1). As mentioned above and discussed in detail below, an articulated coupling between the articulated leading member 28 of the leading end assembly 24 and another portion of the leading end assembly 24 (e.g., the support trolley 30 (FIG. 3)) may enable at least a portion of the articulated leading member 28 (e.g., a trailing surface 46 of the articulated leading member 28) to substantially align (e.g., be plumb with) at least of portion of the pocket 18 (e.g., an outer portion 50 of the pocket 18 formed by two wall portions flanking the opening to the pocket 18).

The articulated leading member 28 may include a leading portion such as, for example, a leading surface 48 that may be positioned adjacent to (e.g., in abutment with) an adjoining structure such as, for example, an opposing wall 26 or the leading end assembly of another movable partition (not shown). The leading surface 48 may be a distal surface of the articulated leading member 28 (e.g., the surface of an element located furthest from the point of attachment with the movable partition 12, the distalmost surface of the movable partition 12 located furthest from the pocket 18). The leading end assembly 24 may further include a trailing portion such as, for example, a trailing surface 46 positioned opposite the leading surface 48. The trailing surface 46 may be a proximal surface of the articulated leading member 28 (e.g., the surface of an element located at the point of attachment with the movable partition 12).

As mentioned above, the leading surface 48 of the leading end assembly 24 may be substantially flat (e.g., substantially planar). For example, a majority of the leading surface 48 of the leading end assembly 24 may lie in a plane oriented transverse to an intended direction of travel of the movable partition 12 along the overhead track 22 (FIG. 1).

As also mentioned above and discussed in detail below, an articulated coupling between the articulated leading member 28 of the leading end assembly 24 and a portion of the leading end assembly 24 may enable at least a portion of the articulated leading member 28 (e.g., the leading surface 48 of the articulating leading member 28) to substantially align with (e.g., be plumb with) at least of portion of the opposing wall 26 (e.g., surface 52 of the opposing wall 26 opposing the pocket 18).

As further shown in FIG. 2, the leading end assembly 24 may be sized to form a barrier at an open end of the pocket 18 of FIG. 1 (e.g., the end of the pocket 18 through which the movable partition 12 may be extended along the overhead track) when the movable partition 12 is in a retracted state. In some embodiments, the leading end assembly 24 may form a barrier substantially covering the open end of the pocket 18. In some embodiments, the leading surface 48 of the leading end assembly 24 may be substantially flush with a portion of the pocket 18 (e.g., a portion of the wall 20 forming the pocket 18) when the movable partition 12 is retracted in a storage position within the pocket 18. In some embodiments, the leading surface 48 may be substantially flat and may be positioned adjacent to the opposing wall 26 in the expanded state. In other embodiments, the opposing wall 26 may include a door jamb set into the opposing wall 26 that may at least partially receive the leading end assembly 24 in the expanded state.

Figure 3:
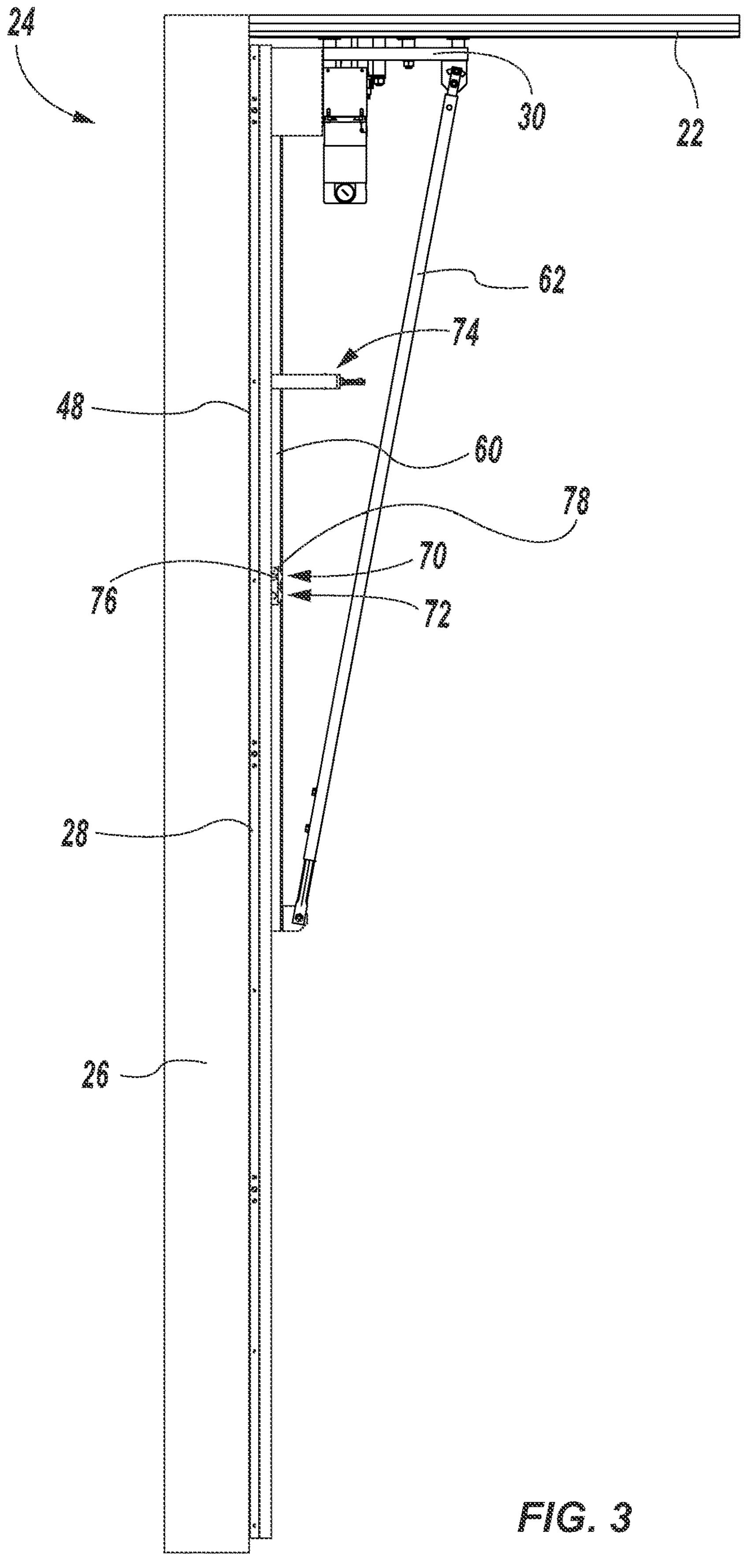
FIG. 3 is a partial cross-sectional side elevation view of a leading end assembly of the movable partition of FIG. 1.

As shown in FIG. 3 the leading end assembly 24 may include a vertical support member 60 and a diagonal support member 62 suspended from the overhead track 22 by a support trolley 30. The vertical support member 60, the diagonal support member 62, and the support trolley 30 may be rigidly coupled to form a rigid triangular support structure. The leading end assembly 24 may include an articulated leading member 28 resiliently and pliably coupled to the vertical support member 60. The articulated leading member 28 may comprise the lead surface 48, which may be rigid and substantially planar.

Figure 4:
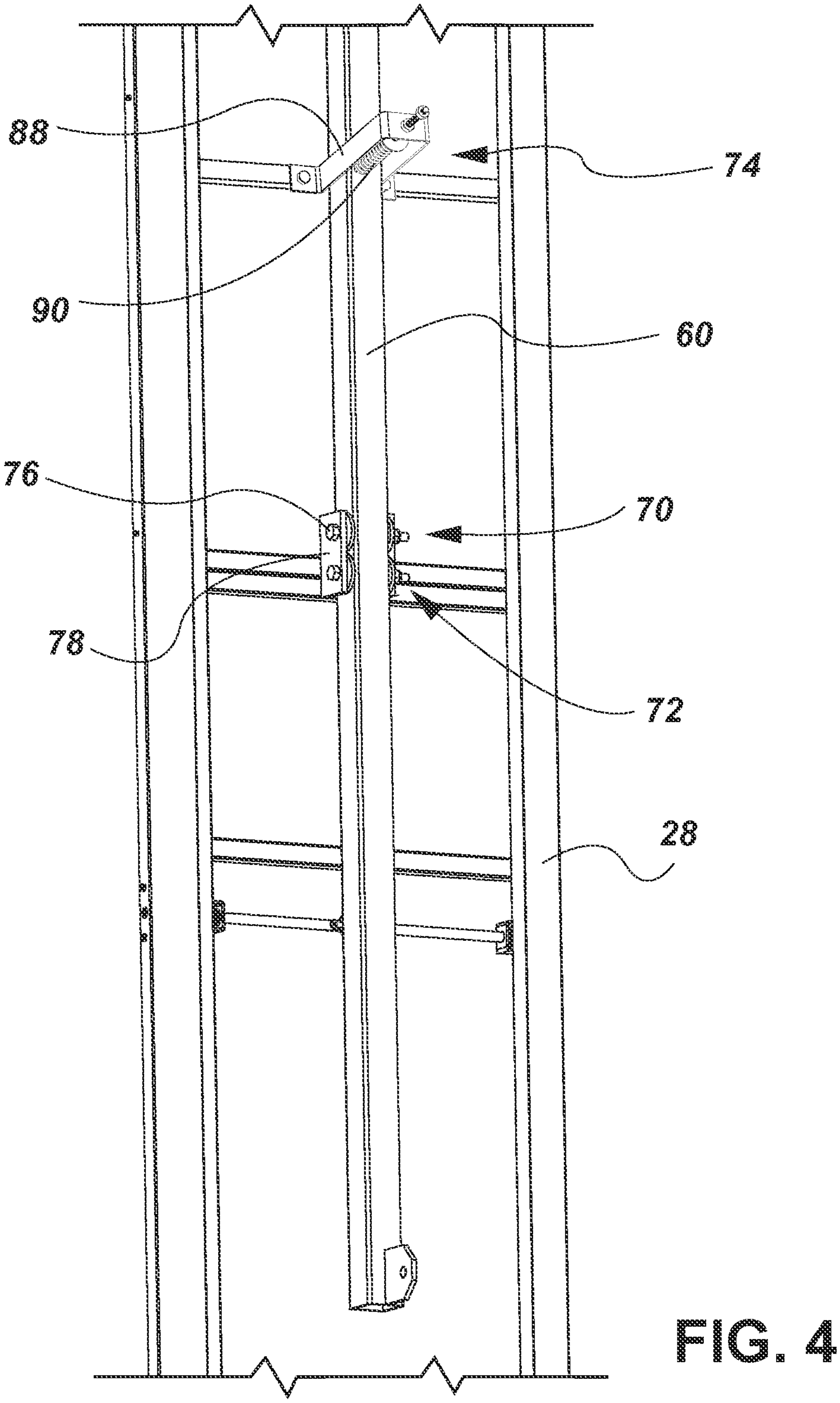
FIG. 4 is a detailed view of an articulated leading member coupled to a vertical support member of the leading end assembly of FIG. 3.

As shown in a detailed view of the articulated leading member 28 and the vertical support member in FIG. 4. A plurality of couplings may couple the articulated leading member 28 to the vertical support member 60, and at least one of the plurality of couplings may provide an articulated coupling between the articulated leading member 28 and the vertical support member 60. For example, the articulated leading member 28 may be coupled to the vertical support member 60 with an articulated coupling 70, a resilient coupling 72, and a counter-balancing coupling 74.

The articulated coupling 70 may comprise a bolt 76 extending through a bracket 78 of the articulated leading member 28 and an aperture through the vertical support member 60. A nut may be tightened on the bolt 76 to secure the bolt 76 to the bracket 78 of the articulated leading member 28.

Figure 5:
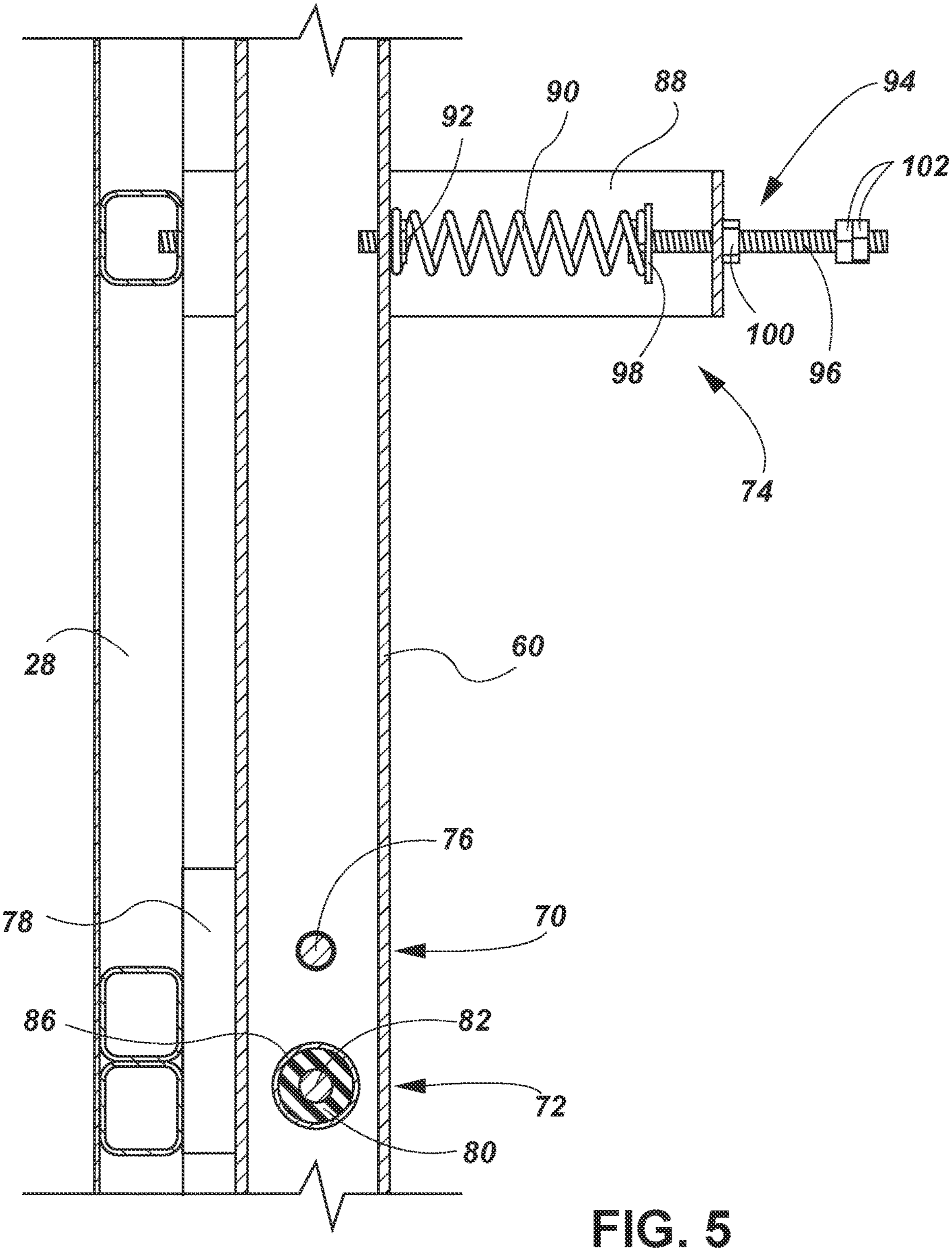
FIG. 5 is a detail cross-sectional view of the articulated leading member coupled to the vertical support member of FIG. 4.

As shown in a cross-sectional detail view in FIG. 5, the aperture through the vertical support member 60 may be slightly larger than an outer diameter of the bolt 76, thus allowing the rotation and movement of the articulated leading member 28 relative to the vertical support member 60 and the support trolley 30.

The resilient coupling 72, may comprise an annular resilient member 80 (e.g., a polyurethane die spring), positioned between a bolt 82 extending through the bracket 78 of the articulated leading member 28 and a sleeve 86 of the vertical support member 60. For example, a segment of metal tube may be positioned in and welded to the vertical support member 60 to provide the sleeve 86.

The counter-balancing coupling 74 may act to counter a torque about the articulated coupling 70 caused by a weight imbalance of the articulated leading member 28 about the articulated coupling 70. As a majority of the mass of the articulated leading member 28 may be positioned on one side (e.g., the leading side) relative to a vertical reference plane extending laterally through the articulated coupling 70, a torque may be applied about the articulated coupling 70 when the articulated leading member 28 hangs freely. This torque may cause the bolt 82 of the resilient coupling 72 to compress the annular resilient member 80, which may result in the articulated leading member 28 hanging out of plumb.

The counter-balancing coupling 74 may apply a force between the articulated leading member 28 and the vertical support member 60 that creates a torque opposing the torque caused by the weight imbalance. Additionally, the force applied by the counter-balancing coupling 74 may be adjusted by an installer to facilitate a desired orientation of the articulated leading member 28, when the articulated leading member 28 is hanging freely. For example, the force applied by the counter-balancing coupling 74 may be adjusted to orient the articulated leading member 28 to align with a surface of the pocket 18.

Referring to FIG. 4, the counter-balancing coupling 74 may comprise a bracket 88 attached to the articulated leading member 28 (e.g., bolted to the articulated leading member 28) that extends around the vertical support member 60, and a spring 90 located between the bracket 88 and the vertical support member 60. Referring again to FIG. 5, a first end of the spring 90 may be held in place with a bolt 92 secured to the vertical support member 60. For example, the head of the bolt 92 may be sized to fit within an inner diameter of the spring 90 and restrict the lateral movement of the first end of the spring 90.

A spring adjustor 94 may be attached to the bracket 88 and contact a second end of the spring 90. For example, the spring adjustor 94 may comprise a bolt 96 with a washer 98 welded to the head of the bolt 96. A threaded portion of the bolt may be coupled to corresponding threads of the bracket 88. For example, a nut 100 may be welded to the bracket 88 and the threaded portion of the bolt 96 may be engaged with the threads of the nut 100.

The second end of the spring 90 may be positioned over the head of the bolt 96 and rest on the washer 98. The head of the bolt 96 may restrict the lateral movement of the second end of the spring 90, and the washer 98 may restrict the longitudinal movement of the second end of the spring 90.

The bolt 96 may be rotated to adjust the distance between the washer 98 and the bracket 88. Accordingly, the amount that the spring 90 is compressed may be adjusted by rotating the bolt 96. The amount that the spring 90 is compressed may determine the amount of biasing force that is applied by the spring 90 to the bracket 88 (and thus the articulated leading member 28 coupled thereto) and to the vertical support member 60. By rotating the bolt 96, and thus adjusting the biasing force applied by the spring 90, the resting orientation of the articulated leading member 28 may be adjusted.

To facilitate the rotation of the bolt 96 while the spring 90 is located over the head of the bolt 96, a set of nuts 102 may be locked together via compression at an end of the bolt 96 opposite the head. Friction between the locked nuts 102 and the threads of the bolt 96 may prevent the rotation of the nuts 102 relative to the bolt 96, so that when a tool, such as a wrench, is applied to the nuts 102 the bolt 96 will rotate with the nuts 102. Accordingly, the compressed length of the spring 90 and the resting orientation of the articulated leading member 28 may be easily adjusted by rotating the bolt 96.

In operation, the movable partition 12 may be moved along the overhead track 22 with a drive motor. The movable partition 12 may be moved from a retracted position within the pocket 18 to the extended position wherein the articulated leading member 28 of the movable partition 12 may be moved into contact with a structure opposite the pocket 18, such as an opposing wall. A portion of the articulated leading member 28 may contact a portion of the adjacent structure. In response to the contact, the articulated leading member 28 may be displaced relative to the support trolley 30 and the leading surface 48 of the articulated leading member 28 may align with a portion of the opposing wall where the articulated leading member 28 is intended to abut.

Likewise, the movable partition 12 may be moved from the extended position to the retracted position within the pocket 18. A portion of the articulated leading member 28 may contact a portion of the pocket 18. In response to the contact, the articulated leading member 28 may be displaced relative to the support trolley 30 and the trailing surface 46 of the articulated leading member 28 may align with a portion of the pocket 18 in which the movable partition 12 is intended to be stored in the retracted position.

Accordingly, the articulated leading member 28 may rotate about a longitudinal axis of the bolt of the articulated coupling 70 in response to a force applied to the articulated leading member 28. Additionally, there may be provided sufficient space between the bolt 76 and the aperture of the articulated coupling 70, and between the bracket 88 of the counter-balancing coupling 74 and the vertical support member 60, to also allow rotation perpendicular to the longitudinal axis of the bolt 76. Accordingly, the articulated leading member 28 may be configured to swivel in all directions about the articulated coupling 70.

When a force is applied to a portion of the articulated leading member 28, such as by contact by an adjacent structure, the articulated leading member 28 may rotate about the bolt 76 of the articulated coupling 70. Upon such rotation, the bolt 82 of the resilient coupling may apply a force to the annular resilient member 80, and the annular resilient member 80 may compress in response to the force from the bolt 82. When the force is no longer applied to the articulated leading member 28, the annular resilient member 80 may resiliently expand to its original shape and cause the bolt 82, and thus the articulated leading member 28, to return to its original position.

Figure 6:
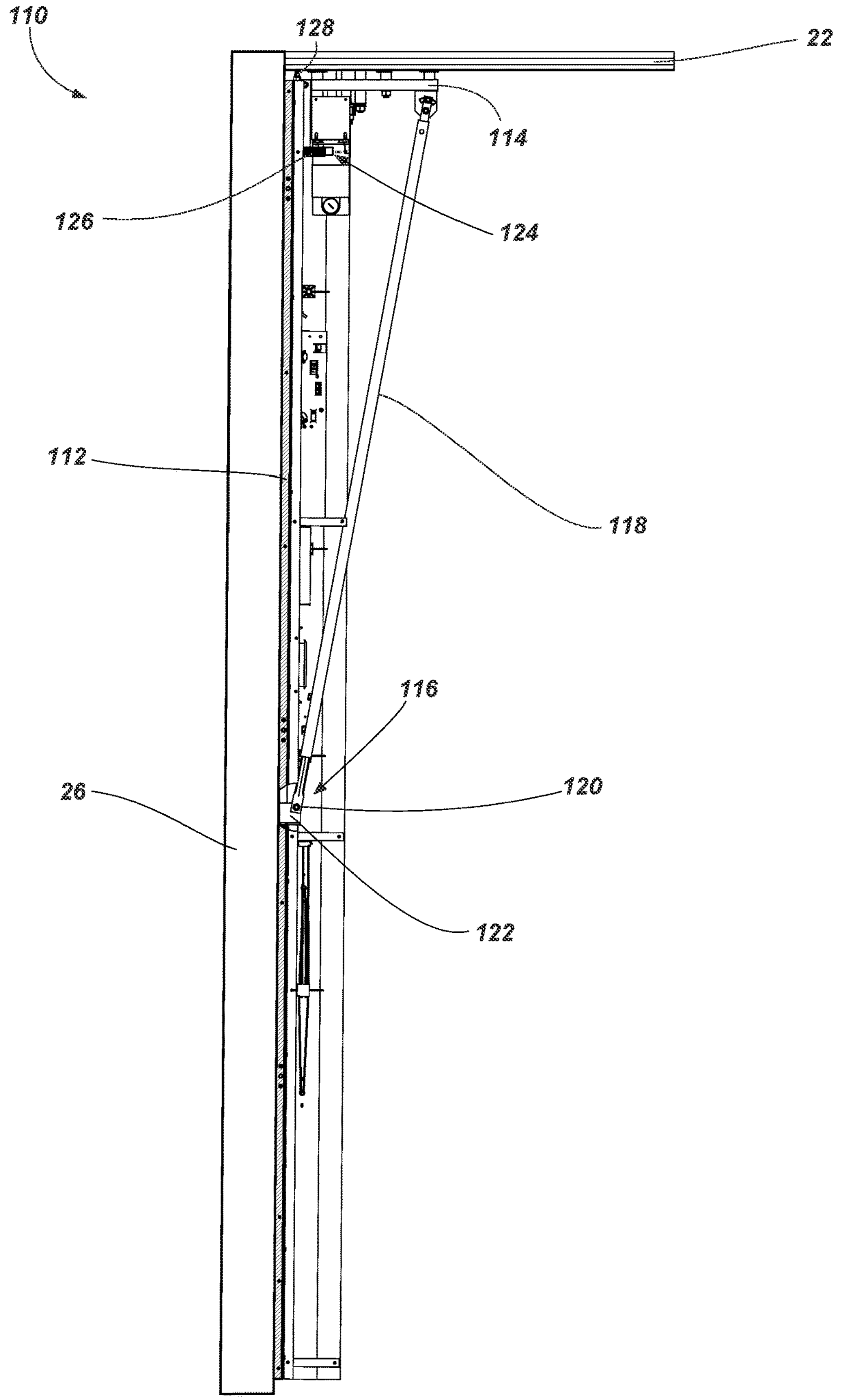
FIG. 6 is a partial cross-sectional side elevation view of a leading end assembly according to an additional embodiment of the present disclosure.
Figure 7:
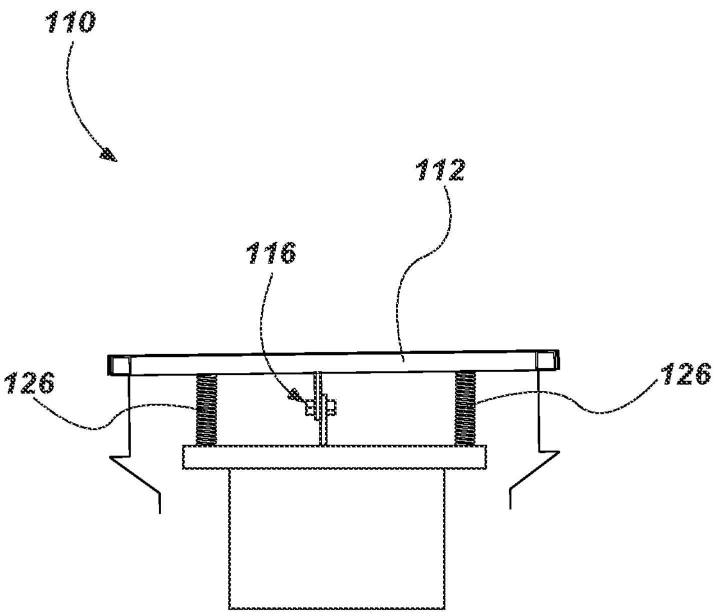
FIG. 7 is a simplified and schematically illustrated partial plan top view of the leading end assembly of FIG. 6.

FIG. 6 shows an additional embodiment of a leading end assembly 110 comprising an articulated leading member 112. The articulated leading member 112 may be coupled to the support trolley 114 via an articulated coupling 116 located at an end of a diagonal support member 118 extending from the support trolley 114. The articulated coupling 116 may comprise a bolt 120 extending through an aperture in a bracket 122 that is attached to the articulated leading member 112 and extending through a corresponding aperture in the diagonal support member 118. A nut, such as a self-locking nut, on the bolt 120 may be positioned so that it is not tight against the bracket 122 or the diagonal support member 118, such that the articulated leading member 112 can swivel in all directions relative to the diagonal support member 118 about the bolt 120. The articulated leading member 112 may additionally be coupled to the support trolley 114 by a resilient coupling 124, which may comprise one or more compression springs 126. For example, as shown in FIG. 7, the resilient coupling 124 may comprise two compression springs 126 extending between the articulated leading member 112 and the support trolley 114.

The weight of the articulated leading member 112 may be suspended by a trolley 128 (see FIG. 6) that is separate from and movable relative to the support trolley 114. Accordingly, the leading end assembly 110 may not include any counter-balancing coupling.

In view of the foregoing, leading end assemblies and movable partition systems in accordance with embodiments of the present disclosure may provide enhanced positioning of the leading end assembly of a movable partition system. For example, such leading end assemblies may be capable of automatically (e.g., without human intervention) align with one or more surrounding structures (e.g., one or both of a forward portion of a pocket in which the movable partition is storage and an opposing wall). In some embodiments, all four corners of one respective side of the leading member may be aligned with one or more surrounding structures. For example, all four corners of the trailing surface of the leading member may be aligned with a surface of the pocket when the movable partition is in a retracted position and/or all four corners of the leading surface of the leading member may be aligned with a surface of the opposing wall when the movable partition is in an expanded position.

Such alignment of the leading end assembly may also reduce the relative complexity of installation of a movable partition system as compared to conventional movable partition systems. For example, such a leading end assembly may require less adjustment of the leading end assembly in order to align portions of the movable partition systems (e.g., the leading member of the leading end assembly) with surrounding structures. In many applications, multiple structures surrounding the movable partition system may have differing orientations making it difficult, if not impossible, to align portions of the leading end assembly to each surrounding structure. Embodiments of the instant disclosure enable the leading end assembly to adjust (e.g., automatically adjust) to the differing surfaces of such surrounding structures requiring less installation time and providing enhanced alignment relative to such surrounding structures. Such enhanced alignment of the leading end assembly may be particularly beneficial where the movable partition is implemented as a fire and/or security barrier as discussed above.

While particular embodiments of the disclosure have been shown and described, numerous variations and alternate embodiments encompassed by the present disclosure will occur to those skilled in the art. Accordingly, the disclosure is only limited in scope by the appended claims and their legal equivalents.

What is claimed is:

1. A movable partition system, comprising:
a movable partition comprising:
- a plurality of hingedly coupled panels movably coupled to a track and suspended thereby, hanging in a first direction; and
- a leading end assembly coupled to at least one panel of the plurality of hingedly coupled panels, the leading end assembly comprising:
  - a support trolley for moving the leading end assembly along the track;
  - an articulated leading member extending in the first direction;

a vertical support member coupled to the support trolley and extending from the support trolley, a length of the vertical support member extending along and adjacent to the articulated leading member in the first direction;

a diagonal support member including a first end, proximal to the support trolley, coupled to the support trolley and a second end, distal to the support trolley, coupled to the vertical support member, the diagonal support member extending from the support trolley to the vertical support member forming a triangular support structure with the vertical support member and the support trolley; and at least one coupling connecting the articulated leading member and the vertical support member at a position on the length of the vertical support member offset from an end of the vertical support member coupled to the support trolley, the at least one coupling enables the articulated leading member to move relative to the vertical support member and the support trolley.

2. The movable partition system of claim 1, wherein the at least one coupling is configured to enable the articulated leading member to rotate about at least one axis relative to the vertical support member.

3. The movable partition system of claim 1, wherein the at least one coupling is configured to enable the articulated leading member to rotate about at least two axes relative to the vertical support member, and wherein a first axis of direction of the at least two axes of direction is perpendicular to a second axis of direction of the at least two axes of direction.

4. The movable partition system of claim 1, wherein the at least one coupling comprises an articulated coupling.

5. The movable partition system of claim 4, wherein the at least one coupling further comprises a resilient coupling.

6. The movable partition system of claim 5, wherein the resilient coupling comprises an annular resilient member positioned between a bolt extending through a bracket of the articulated leading member and a sleeve of the vertical support member.

7. The movable partition system of claim 6, wherein the annular resilient member is comprised of polyurethane.

8. The movable partition system of claim 5, further comprising a counter-balancing coupling positioned and configured to apply a biasing force to the articulated leading member to counter a weight imbalance of the articulated leading member.

9. The movable partition system of claim 8, wherein the counter-balancing coupling is adjustable to apply an adjustable force to the articulated leading member and adjust an orientation of the articulated leading member.

10. The movable partition system of claim 1, further comprising a counter-balancing coupling positioned and configured to apply a biasing force to the articulated leading member to counter a weight imbalance of the articulated leading member.

11. The movable partition system of claim 10, wherein the counter-balancing coupling comprises:

a bracket attached to the articulated leading member, the bracket extending around the vertical support member; and a spring positioned between the bracket and the vertical support member.

12. The movable partition system of claim 10, wherein the biasing force applied by the counter-balancing coupling orients the articulated leading member to align with an opening to a storage pocket.

13. The movable partition system of claim 10, wherein the counter-balancing coupling comprises a compression spring.

14. The movable partition system of claim 1, wherein the articulated leading member of the leading end assembly is configured to move about an articulated coupling in order to abut with an adjoining structure when the movable partition is in an extended position.

15. The movable partition system of claim 1, wherein the articulated leading member comprises a substantially planar leading surface having a size and shape configured to cover a majority of an opening to a storage pocket for the movable partition.

16. The movable partition system of claim 1, wherein the weight of the articulated leading member is supported by a trolley separate from, and movable relative to, the support trolley.

17. A method of operating a movable partition, the method comprising:

moving a movable partition along a track between a retracted position and an extended position, the movable partition comprising: a plurality of hingedly coupled panels movably coupled to the track and suspended thereby, hanging in a first direction; and a leading end assembly coupled to at least one panel of the plurality of hingedly coupled panels, the leading end assembly comprising: a support trolley for moving the leading end assembly along the track; an articulated leading member extending in the first direction; a vertical support member coupled to the support trolley and extending from the support trolley, a length of the vertical support member extending along and adjacent to the articulated leading member in the first direction; a diagonal support member including a first end, proximal to the support trolley, coupled to the support trolley and a second end, distal to the support trolley, coupled to the vertical support member, the diagonal support member extending from the support trolley to the vertical support member forming a triangular support structure with the vertical support member and the support trolley; and at least one coupling connecting the leading member and the vertical support member at a position on the length of the vertical support member offset from an end of the vertical support member coupled to the support trolley, the at least one coupling enables the articulated leading member to move relative to the vertical support member and the support trolley;

contacting an adjacent structure with a portion of the articulated leading member; and responsive to contacting the adjacent structure with the articulated leading member, displacing the articulated leading member to align a majority of at least one surface of the articulated leading member with a portion of the adjacent structure.

18. The method of claim 17, wherein displacing the articulated leading member to align a majority of at least one surface of the articulated leading member with a portion of the adjacent structure comprises aligning the majority of the at least one surface of the articulated leading member with a portion of an opposing wall that the articulated leading member is intended to abut in the extended position.

19. The method of claim 17, wherein displacing the articulated leading member to align a majority of at least one surface of the articulated leading member with a portion of the adjacent structure comprises aligning the majority of at least one surface of the articulated leading member with a portion of a pocket in which the movable partition is intended to be stored in the retracted position.

20. A movable partition system, comprising:

a movable partition comprising:

a plurality of hingedly coupled panels movably coupled to a track;

a leading end assembly coupled to at least one panel of the plurality of hingedly coupled panels, the leading end assembly comprising:

a support trolley for moving the leading end assembly along the track;

an articulated leading member;

a vertical support member extending from the support trolley;

a diagonal support member forming a triangular support structure with the vertical support member and the support trolley; and at least one coupling connecting the articulated leading member and the vertical support member, the at least one coupling enables the articulated leading member to move relative to the vertical support member and the support trolley; and a counter-balancing coupling positioned and configured to apply a biasing force to the articulated leading member to counter a weight imbalance of the articulated leading member, the counter-balancing coupling comprising:

a bracket attached to the articulated leading member, the bracket extending around the vertical support member; and a spring positioned between the bracket and the vertical support member.

* * * * *